(12) United States Patent
Zasowski et al.

(10) Patent No.: US 9,913,145 B2
(45) Date of Patent: *Mar. 6, 2018

(54) METHOD FOR DEPLOYING A CELLULAR COMMUNICATION NETWORK

(71) Applicant: Swisscom AG, Bern (CH)

(72) Inventors: Thomas Zasowski, Zurich (CH); Marc Kuhn, Gockhausen (CH); Raphael Rolny, Zurich (CH)

(73) Assignee: SWISSCOM AG, Bern (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/950,270

(22) Filed: Nov. 24, 2015

(65) Prior Publication Data

US 2016/0088491 A1     Mar. 24, 2016

Related U.S. Application Data

(63) Continuation of application No. 14/475,002, filed on Sep. 2, 2014, now Pat. No. 9,198,048, which is a
(Continued)

(30) Foreign Application Priority Data

Dec. 29, 2011  (EP) .................................... 11405379

(51) Int. Cl.
  *H04W 16/18*  (2009.01)
  *H04W 84/04*  (2009.01)
  (Continued)

(52) U.S. Cl.
  CPC ........... *H04W 16/18* (2013.01); *H04W 16/14* (2013.01); *H04W 16/24* (2013.01); *H04W 16/28* (2013.01);
  (Continued)

(58) Field of Classification Search
  CPC ... H04W 4/008; H04W 80/10; H04W 72/085; H04W 67/023; H04W 24/02; H04W 84/042
  (Continued)

(56) References Cited

U.S. PATENT DOCUMENTS

2010/0248730 A1   9/2010  Han et al.
2010/0317292 A1*  12/2010 Takatani ............. H04W 72/085
                                          455/63.1
(Continued)

FOREIGN PATENT DOCUMENTS

WO   2010060185   6/2010
WO   2011100672   8/2011

OTHER PUBLICATIONS

European Search Report for EP11405379.6, dated Jul. 27, 2012 (6 pages).

*Primary Examiner* — Phuoc H Doan
(74) *Attorney, Agent, or Firm* — McAndrews, Held & Malloy, Ltd.

(57) ABSTRACT

Methods and systems are provided for optimizing communication networks, such as cellular communication networks. A super-cell may be configured a communication network, with the super-cell comprising a central cell and at least a part of one cell adjacent to the central cell, with antennas of the super-cell comprising one or more antennas of the adjacent cell, and where the configuring of the super-cell comprises arranging the one or more antennas of the adjacent cell to be directed towards the central cell. The configuring of the super-cell may comprise configuring antennas of the super-cell such that signals from the antennas use at least one same channel resource. The super-cell may be configured to communicate with at least one com-
(Continued)

munication device located within the super-cell without use of any antenna of the central cell of the super-cell.

20 Claims, 1 Drawing Sheet

Related U.S. Application Data continuation of application No. 13/730,788, filed on Dec. 28, 2012, now Pat. No. 8,825,062.

(51) Int. Cl.
*H04W 16/28* (2009.01)
*H04W 16/24* (2009.01)
*H04W 16/14* (2009.01)
*H04W 24/04* (2009.01)
*H04W 52/26* (2009.01)

(52) U.S. Cl.
CPC ......... *H04W 24/04* (2013.01); *H04W 52/265* (2013.01); *H04W 84/042* (2013.01)

(58) Field of Classification Search
USPC ............ 455/422.1, 436, 466, 446, 450, 507; 370/252, 329; 345/156
See application file for complete search history.

(56) References Cited

U.S. PATENT DOCUMENTS

| | | | |
|---|---|---|---|
| 2011/0080884 A1* | 4/2011 | Ohwatari | H04B 7/022 370/329 |
| 2011/0124345 A1 | 5/2011 | Lee et al. | |
| 2012/0166162 A1* | 6/2012 | Hartmann | G06N 3/006 703/2 |

\* cited by examiner

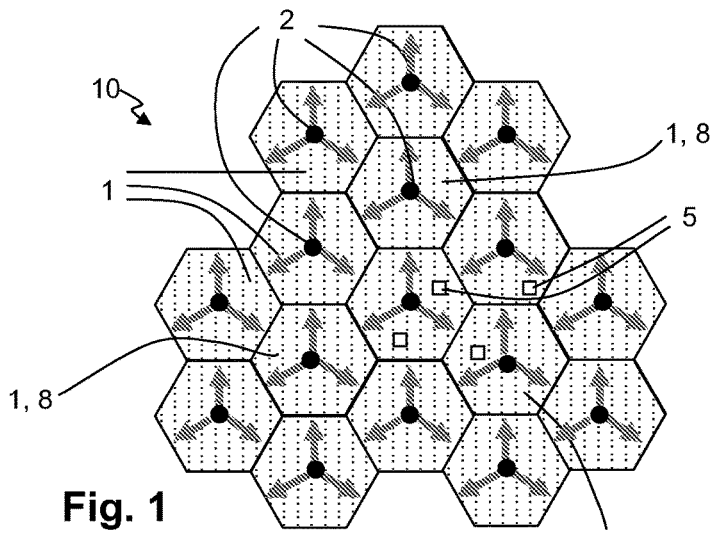
Fig. 1
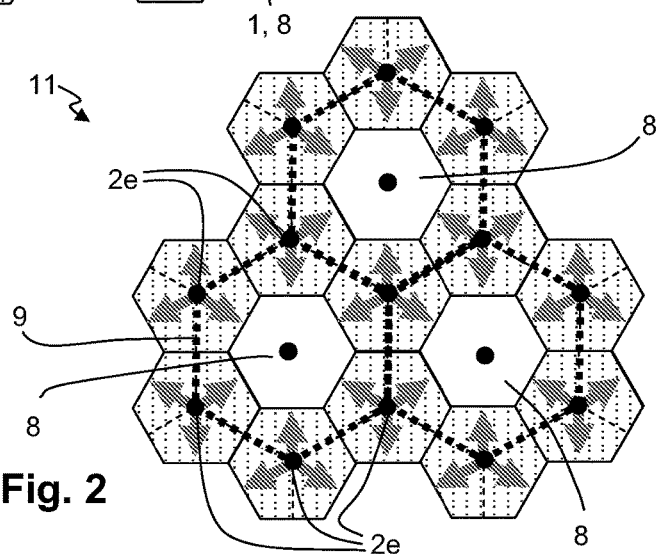
Fig. 2
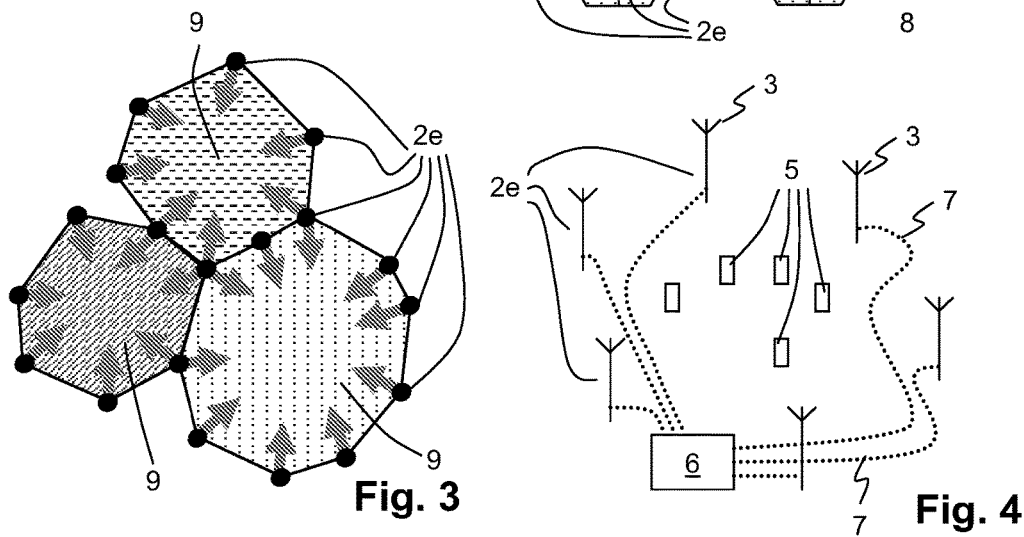
Fig. 3
Fig. 4

METHOD FOR DEPLOYING A CELLULAR COMMUNICATION NETWORK

CLAIM OF PRIORITY AND CROSS-REFERENCE TO RELATED APPLICATIONS/INCORPORATION BY REFERENCE

This application is a continuation of U.S. patent application Ser. No. 14/475,002, filed Sep. 2, 2014, which is a continuation of U.S. patent application Ser. No. 13/730,788, filed Dec. 28, 2012, which in turn claims the filing date benefit of and right of priority to European (EP) Patent Application Serial No. 11405379.6, filed Dec. 29, 2012. Each of the above identified application is hereby incorporated herein by reference in its entirety.

FIELD OF THE INVENTION

The present invention relates to the field of wireless mobile communications. More specifically, certain embodiments of the invention relate to a method for deploying a cellular communication network.

BACKGROUND OF THE INVENTION

Existing cellular networks usually have network cells each comprising a base station located at a central position inside the cell, covering the area of the cell for communicating with mobile devices that may be inside the cell. Required data rates in cellular networks are constantly increasing, but today's cellular networks are planned such that interference is minimized between adjacent base stations. With such current mobile network concepts and existing systems it is difficult to cope with the very high throughput demand. As such, it may be desirable to increase data rates and/or other performance parameters in cellular communication networks based on an existing network structures.

One concept to achieve much higher throughput is the usage of cooperative networks. Cooperation in this regard means that several transceivers (e.g., base stations) can exchange data (e.g., relating to propagation conditions, channel, interference, transmit power, etc.) to optimize the transmission and/or reception to one or more transceivers (e.g., mobile phones). This optimization is usually done to improve quality of service (QoS), e.g., throughput or reliability, but also other optimization criteria can be applied. However, it is not economically viable to establish a cooperative network from scratch where an existing network—which is not designed for cooperation—is already in place.

WO 2010/060185 A1 discloses a method and system for identifying cell clusters within a coordinated multi-point network. The network and a mobile user device together determine a set of cells that is to communicate with the user device. In essence, this is done by selecting cells and base stations from which the user device receives the highest power. Base stations can comprise multiple antennas (e.g., for enabling spatial diversity). US 2011/0124345 A1 discloses a very similar method for selecting a base station or a cell clustering group to participate in communication with a user device. WO 2011/100672 A1 describes a system and method for receiving a channel state information reference signal. For this purpose, groups of network cells can be formed that interfere with each other.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for deploying a cellular communication network, substantially as shown in and/or described in connection with at least one of the figures, or otherwise as described herein, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

Various features and advantages of the invention will become apparent from the following description of non-limiting exemplary embodiments, with reference to the appended drawings, in which:

FIG. 1 is a block diagram illustrating an example of a cellular communication network in an initial state.

FIG. 2 is a block diagram illustrating an example of a cellular communication network in a reconfigured state.

FIG. 3 is a block diagram illustrating an example of general shapes of super-cells.

FIG. 4 is a block diagram illustrating an example of antennas of a super-cell linked to a common processing system.

DETAILED DESCRIPTION OF THE INVENTION

Certain embodiments of the present invention may be found in a method and a system for deploying a cellular communication network, as described in the following in more detail with reference to the attached figures. In this regard, various embodiments of the invention may provide a method and a system for deploying a cellular communication network, given an existing network structure, in particular with given base station locations, which may overcome present limitations and/or may allow enhancing performance (e.g., increase data rates and/or other performance parameters).

In particular, deploying a cellular communication network (or any mobile radio communication system) may comprise reconfiguring the cellular communication network, wherein the cellular communication network may in an initial state comprise a plurality of cells, with each cell comprising a base station located at a central position inside the cell and one or more (transmitting and receiving) antennas arranged to cover the area of the cell (e.g., typically by emanating radiation in all directions around the base station) for communicating with communication devices (e.g., mobile communication devices, inside the cell). The reconfiguring may comprise selecting a plurality of cells that are not adjacent to each other, and using these selected cells as central cells. In this regard, for each central cell in the base station(s) of (one or more) cells that are adjacent to the central cell, one or more antennas may be arranged to be directed—e.g., configured to emanate radiation in a limited range of directions and to receive radiation from this limited range—towards the central cell, that is, for example, at least approximately towards the center of a super-cell that is based on the central cell. In this regard, the super-cell, comprising the central cell and part of (typically each of) the adjacent cells, may be configured wherein the outline of the super-cell may be defined by the base stations of the adjacent cells, and antennas of the super-cell comprising the antennas of the adjacent cells that are directed towards the central cell, and optionally also an antenna or antenna array of the central cell. The reconfiguring may also comprise coordinating (e.g., via a common processing system) the emanation of radiation by the antennas of the super-cell so as to communicate with a plurality of communication devices located within the super-cell, wherein the signals from the antennas of the super-cell use at least the same channel resources.

As used in the present disclosure, the terms "antenna" and "antenna array" may be used interchangeably, denoting either a single physical antenna, or a group of physically distinct antennas, which may be located at the same device (e.g., base station) and may act together as one transceiver antenna. Thus, when enhancing an existing cellular network, such as using a cooperative approach, a change in the network structure may take place. In this regard, in a cooperative network, two or more transceiver nodes may share their information to jointly transmit and/or receive— e.g., jointly as a virtual antenna array. This may enable them, for example, to obtain higher data rates and diversity than they could have individually. In more detail, cooperation may mean that several, usually geographically separated base stations with transceivers and/or transceiver antennas (or antenna arrays) exchange data (e.g., on data symbols being transmitted, and/or on propagation conditions, channel properties, interference, transmitting power, etc.) to optimize the transmission to one or more receivers and/or reception from one or more transmitters—these receivers and transmitters typically being mobile communication devices.

The optimization may be done with respect to criteria such as quality of service (QoS), which may include such parameters as reliability or data throughput, and/or with respect to broadcasting power or other criteria, or to an optimization in view of combined criteria. To allow for cooperation between different—e.g., geographically separated—base stations, the RF resources of the base stations may overlap at least in one dimension or domain of channel resources, with these domains being, for example, frequency, time and/or code. For example, cooperating base stations can use the same frequency band, such as for LTE (Long Term Evolution) and other OFDM (Orthogonal frequency-division multiplexing) systems, the same code, such as for UMTS (Universal Mobile Telecommunications System) based systems, and/or other CDMA (Code division multiple access) systems.

Therefore, in accordance with various embodiments of the invention, a number of base stations may be adapted to form one or more super-cells in the resulting reconfigured cellular communication network (or mobile radio communication system). In this regard, rather than have each base station serve the area of one of the original cells only, each base station may be configured to cooperate with the other cells of the same super-cell. The cooperating may be done, for example, by splitting up the original cell into two, three or more subcells (e.g., depending on the placement of the base stations) and combining the subcells of different original cells to form the super-cell. The subcells may also be referred to as antenna sectors, or simply sectors. The antenna sectors of the base stations may be oriented such that coverage inside the super-cell may be optimized, and/or interference towards neighboring super-cells can be minimized. Typically, but not mandatorily, the super-cell may comprise also one of the original cells that is not split up to serve a plurality of super-cells. Frequently, this is one of the central cells. In this manner, the coverage area of a super-cell may be made much larger than the typical coverage area of the individual original cells. The super-cell coverage area is thus served "from the outside" (i.e., from the boundary of the super-cell), instead of "from the inside" (i.e., from a location approximately centrally located within the cell) as in conventional networks.

The present approach may improve cell cooperation benefits achievable over conventional cellular networks, including, but not limited to, throughput and other quality of service (QoS) optimizations. In particular, in accordance with various embodiments of the invention, the performance available to a cellular communication device may improve significantly at or near the cell edge.

In accordance with various embodiments of the invention, base stations may be placed around a coverage area of the super-cell, and antenna patterns may be directed such that (e.g., by cooperative methods) the QoS in a super-cell may be improved, inter super-cell interference may be reduced, and/or the number of base stations can be reduced (e.g., depending on optimization goals). In this regard, when the base stations are placed at cell edges, use of super-cells may allow reducing the number of base stations while improving QoS by applying cooperative concepts. By reducing the number of base stations in the super-cell, the inter super-cell interference can be further reduced as compared to state-of-the-art cell planning approaches. The RF coverage area of a super-cell may be significantly larger than that of a single one of the original cells, depending, inter alia, on the number and geometry chosen to form the super-cell. For example, the area of the super-cell is three times the area of a single original cell. Consequently, for a moving user, fewer handovers are required. In some instances, base station sectors serving the coverage area of a super-cell may use at least some of the same channel resources—i.e., they are not separated in at least one of the frequency, time, and/or code domain. For example, the base stations may be enabled to cooperate by using the same frequency band or bands. Separating communication channels to different mobile devices can then be effected by separation in the time domain, code domain, or other multiple access protocols. While such approach may be used in a typical setup, other variations may also be possible—e.g., the base stations of a cell may share resources in the time domain and/or code domain, and separate the users in the frequency domain.

In accordance with various embodiments of the invention, different options for network operations may be possible or used. Examples of network operations options may relate, for example, one or more of the following different cost and performance parameters: elimination of the central base station(s), to free up resources; increasing network capacity with regard to the number of mobile users/devices; increasing network capacity with regard to data rates—e.g., aggregated data rates and/or data rates provided to individual users and/or; achieving more homogeneous data rate distribution across the cellular coverage area—i.e., mitigating the effect of distance dependent data rate reduction; increasing failure tolerance of base station or antenna; and decreasing transmitting power while achieving the same or similar performance of a conventional network. Each of these example options, or a combination thereof, may be implemented. The improvement of the cost and performance parameters mentioned above may be measured based on a particular reference point. For example, as a reference point for the improvement of the cost and performance parameters mentioned above, the network in its original, initial state can be, for example, used—that is, the network with the original distribution of non-cooperating base stations, each base station corresponding to the center of one cell.

For example, in an example embodiment of the invention, the antennas of the super-cell may be used to increase the data rate or to optimize the distribution of the data rate in communicating to the one or more communication devices inside the super-cell while maintaining essentially the same transmission power as in the initial state. In this regard, the transmission power may typically be the total transmission power emitted by the base stations to serve a particular geographic area. In another example embodiment of the invention, the transmitting power of the antennas of the super-cell can be reduced, in particular while maintaining essentially the same QoS as in the initial state.

In an example embodiment of the invention, the central cell of the super-cell is not required to transmit or receive RF signals because coverage may be assured through the cells adjacent to the central cell. In other words, the antenna of the central cell is disabled and not needed for communication in the new network based on the cooperating edge antennas. However, the central cell, rather than being physically removed, may be used for another network, for example.

In an example embodiment of the invention, the antenna or antenna array of the central cell in the super-cell may be set as omnidirectional antennas or antenna arrays. For example, a central antenna or array of antennas of a central cell which may comprise, for example, three antennas, each covering a 120° sector, may operate with at least some of the same channel resources as the antennas pointing inwards from the border of the super-cell. The inward pointing may allow reusing the base station in the central cell, incorporating it in the new super-cell, allowing for one or more of increasing network capacity, increasing failure tolerance and/or reducing transmitting power.

In an example embodiment of the invention, antennas or antenna arrays of the super-cell may be used to increase the data rate and/or to optimize the distribution of data rates in communicating to a plurality of mobile devices inside the super-cell. For example, this may be done by maximizing the minimum data rate of communication over a plurality of user devices.

In an example embodiment of the invention, antennas or antenna arrays of the super-cell—in particular the antennas of the central cells in cooperation with the antennas of the edge base stations—may be used to increase failure tolerance within the super-cell.

In accordance with aspects of the invention, as a result of cooperative arrangements and operations of the antennas of the super-cells, failure of a single unit such as an antenna or base station of a super-cell may be less significant than in a conventional cellular network. In contrast, when a base station in a conventional network is not operational, service in the corresponding cell will be significantly compromised. Due to the cooperative arrangements and operations, adjacent antennas of the same super-cell may provide coverage at the location of the failed unit, optionally by increasing their power output and/or relaxing QoS requirements and/or adapting an alternative cooperation scheme. This can be done both when the central base station has been kept operating in the cooperating system or when it has been removed therefrom. Further beneficial and/or cost reducing consequences may be that replacements of failed network components do not have to be put in place immediately, and consequently less reliable hardware may be deployed, reducing network operating cost while maintaining the same or similar reliability compared to a conventional network.

In an example embodiment of the invention, the transmitting power of the antennas of the super-cell may be reduced, thus allowing adherence to more stringent restrictions on power emission, while maintaining or increasing QoS.

FIG. 1 is a block diagram illustrating an example of a cellular communication network in an initial state. Referring to FIG. 1, there is shown a network in an initial state 10 (referred to hereinafter as "initial network 10"), which may correspond to a conventional (e.g., cellular communication) network.

The initial network 10 may comprise any suitable logic, circuitry, interfaces, and/or code for implementing various aspects of the invention. The initial network 10 may correspond to an area which may be covered by, for example, hexagonal cells 1, with each cell 1 comprising a base station 2 (e.g., in the middle of the cell 1). Each base station 2 may comprise any suitable logic, circuitry, interfaces, and/or code for implementing various aspects of the invention, including providing communication related functions and/or services in the corresponding cells 2. In this regard, the base stations 2 may comprise antennas or antenna arrays for use in communications to and/or from the base stations 2. For example, each base station 2 may comprise an omnidirectional antenna array or antenna—i.e., the antenna array or antenna is configured to transmit/receive in all directions (or 360°) around the base station 2. Some base stations 2, however, may comprise antenna arrays or antennas that are not omnidirectional.

In the initial network 10, communication with mobile devices 5 within the area of each cell 1 may be achieved by means of the base station 2 of the cell. Each cell 1 may use different communication resources from adjacent cells cell 1 in order to avoid inter-cell interference. Such different communication resources may comprise, for example, different frequency bands, different time slots and/or different coding schemes. Further differences in communication resources may be applied to separate the communication with different mobile devices 5.

In various example embodiments of the invention, the initial network 10 may be reconfigured, such as to enable enhancing performance and/or resource utilization. For example, the initial network 10 may be reconfigured by forming super-cells, which may be centered at particular cells (e.g., the cells denoted 8 in FIG. 1) in the initial network 1. An example of such reconfiguration is described in FIG. 2.

FIG. 2 is a block diagram illustrating an example of a cellular communication network in a reconfigured state. Referring to FIG. 2, there is shown a network in a reconfigured state 10 (referred to hereinafter as "reconfigured network 11"), which may correspond to a reconfigured conventional (e.g., cellular communication) network in accordance with aspects of the present invention.

The reconfigured network 11 may be obtained, for example, from reconfiguring the initial network 10. In this regard, in order to transform the initial network 10 into the reconfigured network 11, a number of non-adjacent cells may be selected, and denoted as central cells 8. Furthermore, given the selected central cells 8, other cells 1 that surround the central cells 8 may also be selected. In some instances, the selected other cells 1 may be adjacent to the central cells 8. The invention is not so limited, however. Each central cell 8, together with at least a part of each of the surrounding cells 1, may be used to form a super-cell 9. In this regard, when forming such super-cells 9 the base stations 2 in the other cells 1 surrounding the central cells 8 may be reconfigured, such as by replacing the omnidirectional antennas with directional antennas transmitting/receiving in sectors. In some instances, antennas may be rearranged to increase the overlapping area for cooperation. For example, whereas in the initial state (e.g., in the initial network 10) antennas in adjacent cells may be oriented so as to not point toward each other, in the reconfigured state (e.g., in the reconfigured network 11), antennas may be oriented to point towards the center of the newly formed super-cell 9. From the point of view of the newly established super-cell 9, these base stations 2 that may be located on the edge of the super-cell 9 may be treated as edge base stations 2e.

In some instances, multiple and separate antennas or antenna arrays may be deployed in some edge base stations 2e, such as to enable serving multiple super-cells 9 (as shown in more details in FIG. 4, below). In this regard, and each antenna or antenna array in the edge base station 2e may be associated with one super-cell 9, and (optionally) the angle or sector covered by this antenna or antenna array may be adjusted to lie within the that (corresponding) super-cell 9. Thus, different antennas or antenna arrays of the same edge base station 2e may serve different super-cells 9. By using directional antennas at base stations (e.g., edge base stations 2e), interference between adjacent super-cells 9 may be minimized. Minimizing interference may allow even for use of the same channel resources, e.g., frequency bands ("reuse factor 1"), in adjacent super-cells 9.

The resulting reconfigured network 11 is schematically depicted in FIG. 2. In this regard, the main direction of the antennas or antenna arrays at the edge base stations 2e, directed towards the center of the respective super-cell 9, is indicated by thick arrows. The resultant super-cells 9 may have, as shown in FIG. 2, an approximately regular hexagonal form. The invention is not so limited, however, and in some embodiments the reconfiguring may allow for flexibility in geographical shaping (e.g., as shown FIG. 3). The edge base stations 2e are all equipped with three directional antenna arrays, such that each base station 2e can serve three super-cells 9 while the interference to adjacent super-cells 9 can be reduced due to the direction of the antenna patterns of the base stations 2e. Also, other geometries of super-cells 9 are possible, e.g. a network setting where three or another number of base stations 2, 2e cooperate with each other and form other geometries of super-cells 9. In some instance, an entire base station 2 (e.g., that of the central cell 8) may be eliminated for each super-cell 9, as compared to conventional networks.

FIG. 3 is a block diagram illustrating an example of general shapes of super-cells. Referring to FIG. 3, there is shown an example layout of a reconfigured network (e.g., the reconfigured network 11) with a plurality of super-cells 9.

In the example reconfigured network layout shown in FIG. 3, some edge base stations 2e in the super-cells 9 may be configured to serve multiple super-cells. In this regard, while some edge base stations 2e may be equipped with a single antenna array, other edge base stations 2e may comprise multiple (e.g., two or three) antennas or antenna arrays, and thus may be configured to serve two or three super-cells 9 at the same time. According to an example embodiment, all super-cells 9 in a reconfigured network (e.g., reconfigured network 11) may communicate using the entire available bandwidth ("reuse factor 1"), while reducing and/or avoiding inter-super-cell interference. For example, inter-super-cell interference may be avoided due to the direction of the antenna patterns of the base stations 2e. Interference between super-cells 9 can be further reduced by applying FDMA, TDMA, or CDMA schemes. In this regard, in contrast to conventional cellular networks, where a single base station is located in the middle (or near the middle) of the area to be served, each super-cells 9 in the reconfigured network 11 may be served by multiple edge base stations 2 that are located on the edges or on the border of the super-cell 9.

Accordingly, regardless of the exact geometry of the super-cell 9 and the placement of its (edge) base stations 2e, each super-cell 9 may be served by multiple (edge) base stations 2e, and optionally also by a central base station 2, which may all cooperate with each other to jointly serve the corresponding area of the super-cell 9. In some instances, the same channel resources used by the signals of cooperating antennas in a super-cell may be common channels of a time division multiplex, frequency division multiplex or code division multiplex communication scheme.

FIG. 4 is a block diagram illustrating an example of antennas of a super-cell linked to a common processing system. Referring to FIG. 4, there is shown a base station (e.g., the edge base station 2e) of a reconfigured network (e.g., the reconfigured network 11).

As shown in FIG. 4, the edge base stations 2e may comprise a plurality of antennas or antenna arrays 3, which may be configured to communicate with each other and optionally also with a central base station (not shown) via a backbone network, such as utilizing a common processing system 6 for example. The common processing system 6 may comprise suitable circuitry, interfaces, logic, and/or code for implementing various aspects of the invention, including, for example, providing common processing functions during reconfiguring networks and/or operations in reconfigured networks. In this regard, it should be understood that the common processing system 6 is shown herein as a conceptual or logical entity—i.e., although it can be implemented by a physically centralized component, it can also be implemented by distributed computing components which are located, for example, at the base stations 2, 2e, exchanging information and working together to achieve common processing functions, such as for achieving cooperation which may be required among the antennas 3 of the super-cell 9. One or more inter-base-station communication links 7 are used to exchange information (e.g., channel information, messages, and/or other knowledge) that may be required to cooperatively communicate between the base stations in order to cooperatively communicate with the mobile devices 5 that are to be served.

Based on the available knowledge, the base stations 2, 2e that correspond to the same super-cell 9 may cooperate on different levels. For example, if high capacity links with low delay are provided between the cooperating base stations, full cooperation with joint beamforming and/or joint data processing may optionally be employed. In this regard, multi-user multiple-in-multiple-out (MIMO) communication between the base stations belonging to the same super-cell 9 and their corresponding mobile devices 5 can be optimized, such that a minimal rate over all mobile devices 5 may be maximized for example. This can be realized by determining (e.g., via the common processing system 6) precoding information for weighting the signals of the antennas of the super-cell, and then implementing this precoding at the geographically separated antennas. Also, other optimization criteria, such as sum-rate, throughput, and others may be possible. The same super-cell setting may also be used for limited cooperation. In this regard, the base stations 2, 2e may exchange limited information to coordinate their transmissions and/or receptions (e.g., scheduling, power allocation, time, and frequency allocation), such as to reduce intra-super-cell interference and maximize desired signals, to allow soft handover, to exploit macro diversity, or others. Cooperation within the super-cell 9 may also be realized by multi-hop communication schemes, such as with the use of additional relays or femtocells. Base stations 2, 2e may also be replaced by relays that may communicate wirelessly with base stations 2, 2e in order to exchange the required information for the transmission/reception with the mobile devices 5.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein.

Accordingly, the present invention may be realized in hardware, software, or a combination of hardware and software. The present invention may be realized in a centralized fashion in at least one computer system, or in a distributed fashion where different units are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method, comprising:
   configuring a super-cell in a communication network that comprises a plurality of cells, the super-cell comprising one of the plurality of cells that is assigned as a central cell and at least a part of another cell from the plurality of cells, adjacent to the central cell, wherein:
   antennas of the super-cell comprise one or more antennas of the adjacent cell; and
   the configuring of the super-cell comprises arranging or causing the arrangement of the one or more antennas of the adjacent cell to be directed towards the central cell; and
   configuring the antennas of the super-cell to use at least one same channel resource for signals communicated from the antennas of the super-cell, wherein the at least one same channel resource comprises a common channel configured for use in accordance with a time division multiplex, a frequency division multiplex, or a code division multiplex based communication scheme.

2. The method of claim 1, comprising configuring at least one antenna of the central cell of the super-cell to communicate, in coordination or cooperation with antennas of one or more adjacent cells that are part of the super-cell.

3. The method of claim 1, comprising configuring the super-cell to communicate with any communication device located within the super-cell without use of any antenna of the central cell of the super-cell.

4. The method of claim 1, comprising replacing, when configuring the super-cell, omnidirectional antennas of a base station of the at least one adjacent cell with directional antennas.

5. The method of claim 1, comprising reconfiguring, when configuring the super-cell, one or more antennas of the at least one adjacent cell to point towards the center of the super-cell.

6. The method of claim 1, comprising deploying in base stations of the at least one adjacent cell separate antennas or antenna arrays associated with the super-cell, wherein the angle or sector covered by the separate antenna or antenna array is adjusted to lie within the super-cell.

7. The method of claim 1, comprising configuring the antennas of the super-cell to increase the data rate or to optimize distribution of the data rate in communicating with at least one communication device located within the super-cell, while maintaining transmission power used prior to configuring the one super-cell.

8. The method of claim 7, comprising optimizing the distribution of the data rate based on maximizing of minimum data rate of communication over a plurality of the communication devices.

9. The method of claim 1, comprising configuring the super-cell to increase failure tolerance within the super-cell.

10. The method of claim 1, comprising configuring the super-cell to reduce transmission power of the antennas of the super-cell while maintaining the same quality of service.

11. A system, comprising:
    one or more devices for use in a communication network that comprises a plurality of cells, the one or more devices are operable to:
    configure and operate a super-cell in the communication network, wherein:
    the super-cell comprises one of the plurality of cells that is assigned as a central cell and at least a part of another cell from the plurality of cells, adjacent to the central cell;
    antennas of the super-cell comprise one or more antennas of the adjacent cell; and
    the one or more antennas of the adjacent cell are arranged to be directed towards the central cell; and
    configure the antennas of the super-cell to use at least one same channel resource for signals communicated from the antennas of the super-cell, and wherein the at least one same channel resource comprises a common channel configured for use in accordance with a time division multiplex, a frequency division multiplex, or a code division multiplex based communication scheme.

12. The system of claim 11, wherein the one or more devices are operable to configure at least one antenna of the central cell of the super-cell to communicate, in coordination or cooperation with antennas of one or more adjacent cells that are part of the super-cell.

13. The system of claim 11, wherein the one or more devices are operable to configure the super-cell to communicate with any communication device located within the super-cell without use of any antenna of the central cell of the super-cell.

14. The system of claim 11, wherein an antenna or antenna array of the central cell of the super-cell comprise an omnidirectional antenna or an omnidirectional antenna array.

15. The system of claim 11, wherein an antenna or antenna array of a base station of the at least one adjacent cell comprise an omnidirectional antenna or an omnidirectional antenna array, and
when configuring the super-cell, the omnidirectional antenna or an omnidirectional antenna array of the base station of the at least one adjacent cell are replaced with directional antennas.

16. The system of claim 11, wherein the one or more devices are operable to reconfigure, when configuring the super-cell, one or more antennas of the at least one adjacent cell to point towards the center of the super-cell.

17. The system of claim 11, wherein the one or more devices are operable to configure the antennas of the super-cell to increase the data rate or to optimize distribution of the data rate in communicating with at least one communication device located within the super-cell, while maintaining transmission power used prior to configuring the one super-cell.

18. The method of claim 17, wherein the one or more devices are operable to optimize the distribution of the data rate based on maximizing of minimum data rate of communication over a plurality of the communication devices.

19. The system of claim 11, wherein the one or more devices are operable to configure the super-cell to increase failure tolerance within the super-cell.

20. The system of claim 11, wherein the one or more devices are operable to configure the super-cell to reduce transmission power of the antennas of the super-cell while maintaining the same quality of service.

* * * * *